United States Patent [19]

Suzuki et al.

[11] 4,179,197

[45] Dec. 18, 1979

[54] SOUND MOTION PICTURE PROJECTION SYSTEM

[75] Inventors: Kuniyoshi Suzuki, Machida; Akira Ashida, Yokohama; Takashi Itani, Yokohama; Tateo Yamada, Yokohama; Masaya Maeda, Kawasaki; Kiyoshi Takahashi, Kunitachi; Hiroyuki Takimoto, Tokyo, all of Japan

[73] Assignee: Canon Kabushiki Kaisha, Tokyo, Japan

[21] Appl. No.: 790,762

[22] Filed: Apr. 25, 1977

[30] Foreign Application Priority Data

Apr. 27, 1976 [JP] Japan .................................. 51/48289

[51] Int. Cl.² ............................................. G03B 31/00
[52] U.S. Cl. ........................................ 352/14; 352/27
[58] Field of Search ................................ 352/14, 27

[56] References Cited

U.S. PATENT DOCUMENTS

| 3,048,081 | 8/1962 | Biedermann et al. | 352/27 |
| 3,224,828 | 12/1965 | Chytil | 352/27 |
| 3,244,469 | 4/1966 | Hennessey et al. | 352/14 |
| 3,597,056 | 8/1971 | Sasaki | 352/14 |

Primary Examiner—Monroe H. Hayes

Attorney, Agent, or Firm—Toren, McGeady and Stanger

[57] ABSTRACT

A sound motion picture projection system which can be formed by a combination of a silent film projector and a sound recording and reproducing unit, wherein a silent film projector and a separate sound recording and reproducing unit are provided and minor modification is given to said silent film projector so that said silent film projector can be used as a projection unit only with said minor modification.

And especially in this system when said sound unit is attached to said projection unit and continuous film advancing means provided at said sound unit is connected with a driving motor provided at said projection unit through a power transmission mechanism, and at a same time an intermittent film advancing means provided at a projection unit is connected with a part of said power transmission mechanism through a power transmission mechanism of variable speed type, further an output member of a loop sensing means provided at the sound unit is connected with said variable speed power transmission mechanism, so that an operating speed of the intermittent film advancing means at the projection unit is controlled depending on the change in an amount of film loop formed between a projection station of the projection unit and a sound recording and a reproducing station of the sound unit.

5 Claims, 6 Drawing Figures

SOUND MOTION PICTURE PROJECTION SYSTEM

BACKGROUND OF THE INVENTION

1. Field of the Invention

The present invention relates to a motion picture projection device such as a cine-projector, etc.

2. Description of the Prior Art

Nowadays, as a motion picture projector such as a cine-projector, etc., a so-called a sound projector which can reproduce picture image information and sound information simultaneously and a silent projector which can reproduce picture image information only are offered in the market.

One of the reasons for these sound projector and silent projector being offered is their prices and corresponding functions. That is, when a sound projector and a silent projector are compared, since a silent projector does not need to have a device for reproduction and recording of sound information to be built in, its structure becomes simple thus its production cost is lower than that of a sound projector, therefore it can be offered at a lower price than that of a sound projector. On the other hand, from a standpoint of a user who is to buy a projector, there is a person who wants to get a low priced projector which can at least reproduce picture image information only even if it can not reproduce sound information and picture image information simultaneously, while there is a different person who wants to buy a projector which can reproduce sound information and picture image information simultaneously even if its price is somewhat higher, thus such different types of projectors are offered to satisfy the needs of market.

As another reason therefor, as a film for projection, while there is a so-called sound film, there is also a silent film which has picture image information recorded thereon but has no sound information recorded thereon, and for a person who is using such silent film, a projector which has a sound recording and reproducing device built in is not only unnecessary, but is too heavy and too large in size as the projector has said sound recording and reproducing device built in, thus it is inconvenient for carrying and handling.

However, even a person who only has a silent projector, sometimes wishes to have both sound information and picture image information reproduced simultaneously and enjoy the same by using a sound film, but in that event his silent projector can not reproduce sound information, thus as a matter of course he is required to have a sound projector available. But, if a sound projector can be formed by using his silent projector, that is using his silent projector as a projection unit with minor modification and attaching a separate sound recording and reproducing unit thereto, then he does not have to buy a high-priced sound projector only for that special occasion of using a sound film, yet he can have said desired simultaneous reproduction done successfully, using an already available projector almost as it is, thus it is quite convenient in practical use.

Now a conventional sound projector and a conventional silent projector are made with no common features therebetween in manufacturing process, and are produced independently from each other. Therefore, component parts for a sound projector and those for a silent projector are made separately, thus production and maintenance of those component parts need to be done in a so-called small-lot multi-kinds production (maintenance) style, resulting in increased cost of the products for a manufacturer.

Particularly it is quite unreasonable both in operation efficiency and labor to have a silent projector assembling line and a sound projector assembling line separately provided for assembling of said component parts.

Therefore, for a manufacturer, it is desirable to have common component parts for a silent projector and a sound projector and to have a common assembling line therefor as much as possible.

That is, component parts for a silent projector and those for a sound projector are made common therebetween as much as possible, and at a same time an assembling line for projection units for sound projectors is provided in a middle of an assembling line of silent projectors, and on the other hand an assembling line for sound recording and reproducing units is provided separately, so that in the assembling line of sound projectors, said projection units and sound units are assembled together at its last process, then such projection arrangement and set up can enhance operating efficiency and save labor, thus cost of the products can be greatly reduced.

SUMMARY OF THE INVENTION

The present invention is made in view of the above, and it is a primary object thereof to provide a unique sound motion picture projection system consisting of a combination of a silent film projector and a sound recording and reproducing unit, wherein a separate sound recording and reproducing unit is prepared for a silent film projector so that said silent film projector is used as a projection unit with minor modification.

Another object of the present invention is to provide a unique coupling system for such projection unit and sound unit as mentioned above in a sound motion picture projection system consisting of a combination of said both units, in which an intermittent film advancing means for motion picture projection in a projection unit and a continuous film advancing means for sound recording and reproducing in a sound unit are driven by a single driving motor provided at a projection unit side, and the film advancing speed of said intermittent film advancing means is adjusted according to the change in the amount of the film loop formed between the projection station of the projection unit and the sound recording and reproduction station of the sound unit, to satisfactorily maintain the synchronization of the reproduced sound and picture.

And as such connecting system for such projection unit and sound unit as mentioned above in a sound motion picture projection system consisting of a combination of said two units, such system is proposed in the present invention that when a sound unit is attached to said projection unit, a continuous film advancing means provided at said sound unit is connected to a driving motor provided at said projection unit through a power transmission mechanism and at a same time an intermittent film advancing means provided at the projection unit is connected to a part of said power transmission mechanism through a variable speed power transmission mechanism, further an output member of a loop sensing means provided at the sound unit is coupled with said variable speed power transmission mechanism, so that the operating speed of the intermittent film advancing means at the projection unit is controlled according to the change in the amount of film loop formed between the projection station of the projection unit and the sound recording and reproduction station of the sound unit.

Said adjustment of the film advancing speed in the projection station according to the change in the amount of the film loop formed between the projection station and the sound recording and reproducing station in the above mentioned connecting system is very advantageous in an adjustment in satisfactorily maintaining the synchronization of reproduced picture and sound leaving no awkward and dull feeling for spectators. That is, when irregularity in reproduced picture image and irregularity of reproduced sound caused by variation in the film advancing speed are compared, human sense is more sensitive to the latter.

As a more detailed and concrete system for the mutual coupling of the projection unit and the sound unit mentioned above, such system is proposed as a preferred embodiment of the present invention that first, a base plate of a silent projector used as a projection unit and a first guide path member for silent film which defines the film path between the projection unit and a film take-up reel are made to be freely removable, and at a same time, a tubular pulley provided within a power transmission path between the driving motor and the intermittent film advancing means is made to be exchangeable with a first cone pulley, and on the other hand a second film guide path member for sound film to define the film path between the sound recording and reproduction station and said film take-up reel is provided on the sound unit in place of said first film guide path member for silent film when said sound unit is coupled to a base part of the projection unit in place of said base plate, and a power transmission mechanism, which has a second cone-pulley corresponding to the above mentioned first cone-pulley and is to transmit the driving power of the driving motor in the projection unit to the continuous film advancing means at said sound unit, and a loop sensing means for sensing the change in the amount of the film loop formed between the projection station of the projection unit and the sound recording and reproduction station of the sound unit are provided also at the sound unit, further as said both units are connected together, first after the connection between the driving motor and the intermittent film advancing means at the projection unit is released and said tubular pulley is replaced with the first cone-pulley, the driving motor and the power transmission mechanism at the sound unit are connected with belt, and at a same time the second cone-pulley in said power transmission mechanism and the first cone-pulley are connected with belt constituting a variable speed power transmission mechanism therebetween, further, the output member of the loop sensing means is connected to the belt member of said variable speed power transmission mechanism. And such system constitutes a simple and effective connecting system between a projection unit and a sound unit in a sound motion picture projection system consisting of a combination of said both units, and is particularly advantageous in making the components common and making the assembling lines common as much as possible between a silent projector and a sound projector also in forming a sound projector instantly based on a silent projector.

Further objects and characterizing features of the present invention will be made clear from the following explanations of examples referring to the attached drawings.

BRIEF DESCRIPTION OF THE DRAWINGS

Now, explanations will be made on a preferred example of the present invention referring to the attached drawings.

DETAILED DESCRIPTION OF THE PREFERRED EMBODIMENTS

First, explanations will be made on an example of a silent film projector which can be used as a projection unit in a sound motion picture projection system. A main body of a silent film projector is shown as 1 in said drawings.

Figure 1:
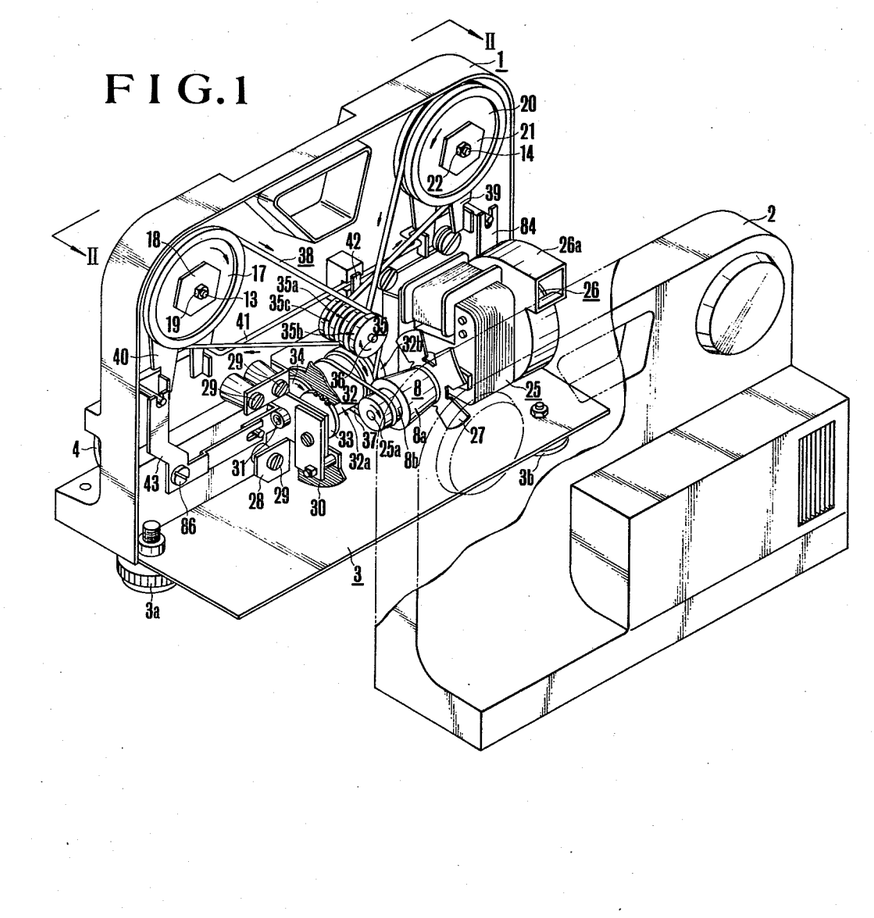
FIG. 1 is an oblique view of an example of a silent film projector which can be used as a projection unit in a sound motion picture projection system of the present invention, showing a state that a cover is removed from its main body for facilitating the understanding of its internal structure.
Figure 2:
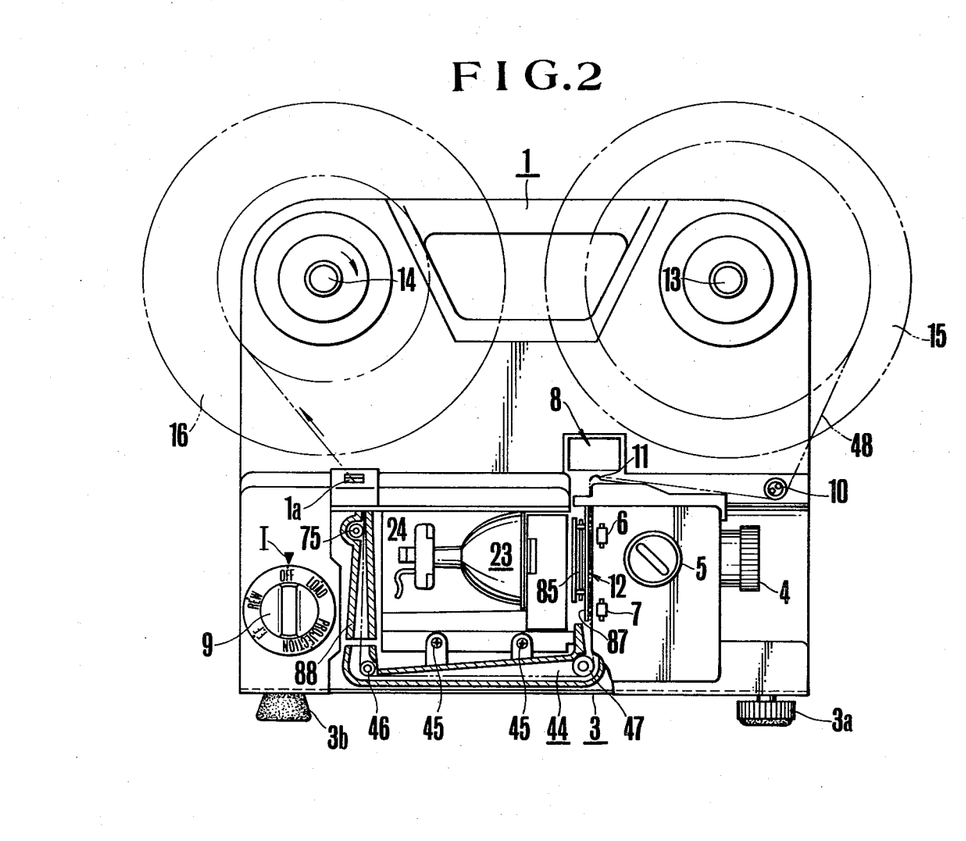
FIG. 2 is a side elevation taken at II—II line in FIG. 1, showing a state that a portion of a housing is removed for facilitating the understanding of its inner structure.

What is shown as 2 is a cover to cover a mechanical part of said silent projector, and 3 is a base plate provided in such manner as being selectively removable, while 3a is a tilting foot provided at the base plate 3 in such manner as having its height adjustable. What is shown as 4 is a projector lens barrel, and 5 is a focusing operation handle, while 6 is a slow motion operating handle. What is shown as 7 is a framing adjustment handle, and 8 is a pilot lamp display window, while 9 is a switch operating handle.

What is shown as 1a is a film take out opening provided at the main body 1, and 10 is a film guide roller axially supported at the main body 1 in a rotatable manner, while 11 is a film damper. What is shown as 12 is a picture projection station having a claw member 85 as an intermittent film advancing means for picture projection, and 13 is a film supply reel axle axially supported at the main body 1 in a rotatable manner, having a supply reel 15 attached thereto. What is shown as 14 is a film take up reel axle axially supported at the main body 1 in a rotatable manner, having a take up reel 16 attached thereto, and what is shown as 17 is a pulley attached to the supply reel axle 13 by a washer 18 and a bolt 19 in such manner as integrally rotatable with said supply reel axle 13, while 20 is a pulley attached to said take up reel axle 14 by a washer 21 and a bolt 22 in such manner as rotatable integrally with said take up reel axle 14. What is shown as 23 is a projection lamp attached to a socket 24, and what is shown as 25 is an induction motor, while 26 is a sirocco fan rotated by the driving power of the induction motor 25. What is shown as 26a is an air blow duct therefor, and said fan 26 is to cool the lamp 23. What is shown as 27 is a motor cooling fan fixed to a motor axle 25a of the motor 25, and what is shown as 8 is a pulley having a cone pulley part 8a and a tubular pulley part 8b, and said pulley 8 is fixed to the motor axle 25a. What is shown as 28 is a ground plate to hold the induction motor 25, the sirocco fan 26, etc., and said ground plate 28 is fixed to the main body 1 by a screw 29. What is shown as 30 is a rotating shutter blade fixed on a shutter axle 31 which is axially supported to the ground plate 28, and what is shown as 32 is a pulley having a first tubular pulley part 32a and a second tubular pulley part 32b formed thereon, wherein said pulley 32 is attached to the shutter axle 31 in a freely removable manner. What is shown as 33 is a slow motion projection control gear and is in an engaged state with a gear (not shown in the drawing) fixed on the shutter axle 31. What is shown as 34 is a rotating cam plate fixed on the shutter axle 31, and said cam plate 34 rotates integrally with the shutter axle 31 as the shutter axle 31 is rotatingly driven to drive the claw member 85 as an intermittent film advancing means which intermittently advances the film at its projection station 12. What is shown as 35 is a pulley having a first pulley part 35a, a second pulley part 35b and a third pulley part 35c formed thereon, and said pulley 35 is fixedly provided on a rotation axle 36 which is axially supported at the projector main body 1 in a rotatable manner. What is shown as 37 is a power transmission belt spanned between the tubular pulley part 8b of the pulley 8 and the pulley part 32a of the first tubular pulley part 32a, and what is shown as 38 is a power transmission belt spanned from the first pulley part 35a of the pulley 35→the pulley 17→the second pulley part 35b of the pulley 35→pulley 20→the third pulley part 35c of the pulley 35, then to the second tubular pulley part 32b of the pulley 32. What are shown as 39, 40 are reel clutch operating plates to control the power transmission from the motor 25 to the supply reel axle 13, the take-up reel axle 14. And what is shown as 41 is a slide operating bar to operate the reel clutch operating plates 39, 40, and said slide operating bar 41 can be shifted between a first position (a position as being shifted to right direction) to be located in a direction of extension of FIG. 1, a second position (a neutral position) and a third position (a position being shifted to left direction). What is shown as 43 is a bell crank for controlling a film pressure plate and a claw member, being axially supported at the main body 1 by a screw 86 planted on said body 1 in a rotatable manner, and said bell crank 43 is associatedly coupled with the sliding bar 41 and is functionally coupled with the pressure plate 87 and the claw member 85.

What is shown as 44 is a first film guide path member attached to the main body 1 by a screw 45 in a freely removable manner, and an one way clutch roller 47 and a guide roller 46 are axially attached to said path member 44 in a rotatable manner.

What is shown as 88 is a second film guide path member fixed to the main body 1 in such manner as unremovable and as continuedly adjacent to an outlet of said first path member 44, and what is shown as 75 is a guide roller axially attached within said second path member 88 in a rotatable manner, wherein a film path from the projection station 12 to the take-up reel 16 is defined by said first and second path members 44 and 88.

While a silent film projector which can be applied as a projection unit to a sound motion picture projection system of the present invention has the above mentioned set up, when the operating handle 9 is changed over from the indication "OFF" to the indication "LOAD" against the mark I, the motor 25 is activated and the shutter axle 31 and the cam 34 are rotatingly driven to a direction of an arrow in the drawing through the pulleys 8, 32, further, the take-up reel axle 14 is rotatingly driven to a direction of an arrow in the drawing through the pulleys 32, 35, 20. (In this mode, the lamp 23 is in OFF state, also the clutch between the pulley 17 and the supply reel axle 13 is in OFF state, and even when said pulley 17 is rotated to a direction of an arrow in the drawing, said supply reel axle 13 is not driven at all).

When the forward end of the film 48 wound around the supply reel 15 is pushed into the projection station 13 through the film guide roller 10, a film damper 11, since the film pulldown claw member 85 is driven by the cam 34, the film 48 is advanced intermittently toward the first film guide path member 44, and goes through the clutch roller 47, the guide roller 46 in said path guide member then through the second film guide path member 88, the guide roller 75 and is finally pulled out from the film take-out opening 1a toward the film take-up reel 16, and at this time as said reel 16 is rotated together with the axle 14, the film is automatically taken up to the reel 16.

And when the operating handle 9 is changed over to its indication "PROJECTION" under said state, the projection lamp 23 is lighted, therefore the film 48 will have its picture image information only projected at the projection station 12 by the lamp 23 and the lens 4, and even if sound information is recorded on the film 48, reproduction of said sound information will not be done as a means to reproduce the same is not provided.

Also, a characterizing set up of a silent projector which can be used as a projection unit in a sound motion picture projection system of the present invention is that the base plate 3, the pulley 32 and the film guide path member 44 (including the clutch roller 88, the guide roller 46 and the damper 47) are removable from the main body 1 as desired. And such set up is important in composing a sound motion picture projection system by combining said silent projector with a sound recording and reproducing unit.

Next, explanations will be made on an example of a sound recording and reproducing unit to be combined with said projection unit when a sound motion picture projection system is composed using said silent projector as the projection unit, referring to FIG. 3 and a portion of FIG. 5.

In the drawings, a main body of a sound recording and reproducing unit is shown as 49. Said sound unit main body 49 can be attached to the bottom of said silent projector main body 1 by screws, etc. after removing the base plate 3 and the first film path guide member 44 (including the clutch roller 47 and the guide roller 46). And as the sound unit 49 is coupled to the silent projector main body 1, said sound unit main body 49 and the silent projector main body 1 will have their electric terminals provided respectively at said main bodies connected together so that the power being supplied to the silent projector main body 1 from outside is supplied to various electric circuit devices 79 within the sound unit main body 49.

What is shown as 52 is a rotation axle axially supported at a part of the sound unit main body 49 through a bearing 51 in a rotatable manner, and what is shown as 50 is a pulley fixed to a rotation axle 52, and said pulley 50 has a first cone pulley part 50a and a second conepulley part 50b formed thereon. Also what are shown as 82, 83 are power transmission belts to be placed on said pulley parts 50b, 50a, respectively. What is shown as 53 is a tubular pulley axially supported at the rotation axle 52 in a rotatable manner, and what is shown as 54 is a tubular pulley axially supported in a rotatable manner at a rotation axle 55 which is axially supported in a rotatable manner at the sound unit main body 49, while what is shown as 59 is a sound base plate fixedly provided at the sound unit main body 49. What is shown as 58 is an idler bearing plate for flywheel and said bearing plate 58 is fixed to the sound base plate 59. What is shown as 56 is a tubular pulley fixed to a rotation axle 57 which is axially supported in a rotatable manner at the bearing plate 58. What is shown as 60 is a flywheel receiving plate fixedly provided at the sound unit main body 49, and what is shown as 61 is a capstan axially supported in a rotatable manner by the sound base plate 59 and the fly wheel receiving plate 60, while what is shown as 62 is a flywheel fixedly provided on the capstan 61. Said flywheel 62 is given constant speed characteristics to the capstan 61. What is shown as 62a is a tubular pulley part formed integrally with the flywheel 62. What is shown as 89 is a power transmission belt spanned from the tubular pulley 53→the tubular pulley 56→the tubular pulley part 62a of the flywheel→the tubular pulley 54 and to the tubular pulley 53.

Figure 5:
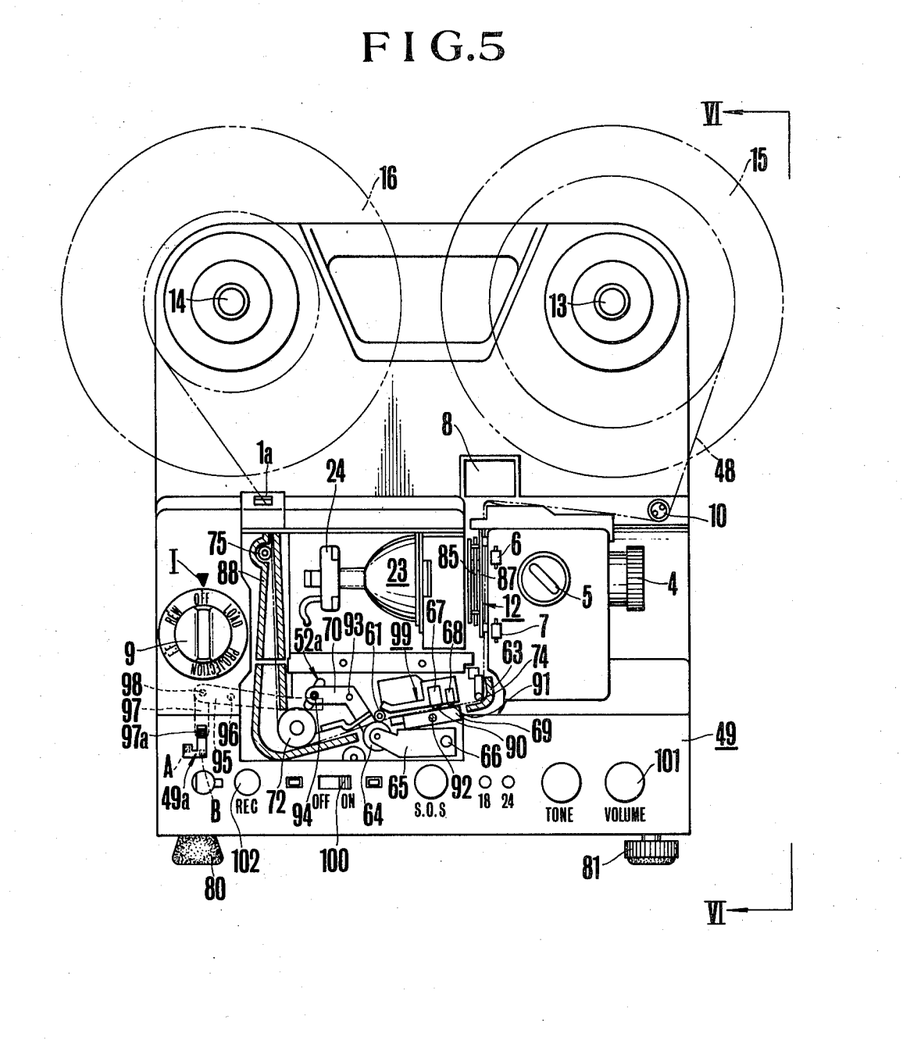
FIG. 5 is a side elevation taken along the line V—V in FIG. 4, showing a state that a portion of housing is removed to show its inner structure.

What is shown 63 is a film guide path member at the sound unit main body 49, to be provided when the film guide path member 44 at the silent projector main body 1 shown in FIGS. 1 and 2 are removed, in place of the same, and said path member 63 is fixed to the round unit main body 49 and a guide roller 72 is axially supported in a rotatable manner at said path member 63 (shown in FIG. 5).

What is shown as 64 is a pinch roller placed at a position opposing to said capstan 61 sandwiching the film running path of the film guide path member 63, and said pinch roller 64 is axially supported in a rotatable manner at a supporting member 65 which is rotatable around a fixed axle 66 fixed at the sound unit main body 49 using said axle 66 as a fulcrum, wherein said supporting member 63 is biased to a clockwise direction in the drawing around an axle 66 by a spring not being shown in the drawing. What is shown as 67 is a sound recording and reproducing head positioned along the film running path of the film guide path member 63, and what is shown as 68 is an erasing head positioned along the film running path of the film guide path member 63, wherein said sound recording and reproducing head 67 and erasing head 68 are electrically connected to the sound recording and reproducing circuits within the electric circuit device 79 provided within the sound unit main body 49. What is shown as 69 is a pad supporting member which has head pads 90, 91 at positions opposing to the head 67 and the head 68 sandwiching the film running path of the film guide path member 63 and is axially supported in a rotatable manner by a fixed axle 92 of the main body 49. And said supporting member 69 is biased to counter-clockwise direction in FIG. 5 around said axle 92 by a spring not shown in the drawing.

What is shown as 70 is a release lever to release the pinch roller 64 from a state being pressure contacted with the capstan 61, and is axially supported in a rotatable manner by an axle 93, and at a same time is connected to a pinch roller supporting member 65 at its forward end, while a pin 94 which goes through a long hole 59a provided at a part of said sound base plate 59 is provided at tail end of said lever 70.

What is shown as 95 is an intermediate lever to actuate said release lever 70 and is axially supported in a rotatable manner by an axle 96 and is engaged at its forward end with a pin 94 planted at said lever 70, also its tail end is linkedly connected to an operating lever 97 having an external operating knob 97a by a pin 98.

Said operating knob 97a sticks out of the main body 49 through a "J" shape hole 49a provided at a part of the housing of the sound unit main body 49, and when said knob 97a is at a position shown in the drawing the levers 97, 95 and 70 are in their state shown in the drawing while the pinch roller 64 is elastically contacted with the capstan 61 by a power of a spring not being shown in the drawing but working on the supporting member 65, and when the knob 97a is brought to the position shown as A in the drawing along the "J" shape hole 49a, the intermediate lever 95 is rotated around the axle 96 through the operating lever 97 to counter-clockwise direction, and at this time the release lever 70 is rotated to clockwise direction around the axle 93 through the pin 94 by the forward end of said lever 95, thereby said release lever 70 rotates the pinch roller supporting member 65 by a forward end thereof not being shown in the drawing to counter-clockwise direction around the axle 66 resisting the spring not being shown in the drawing, to have the pinch roller 64 separated from the capstan 61.

And since said pad supporting member 69 is in an associated relationship with the pinch roller supporting member 65, pads 90, 91 are elastically contacted with heads 67, 68 respectively by the power of a spring not being shown in the drawing in a state wherein the pinch roller 64 is in elastic contact with the capstan 61 as shown in the drawing, but when the pinch roller supporting member 65 separates the pinch roller 64 from the capstan 61, the member 69 is rotated to clockwise direction around the axle 92 in an association with the shifting of said supporting member 65 at that time resisting the power of the spring not being shown in the drawing, separating the pads 90, 91 from the heads 67, 68, respectively.

Also, when the knob 97a is brought to the position shown as B in the drawing, said knob 97a, operating lever 97, intermediate lever 95, release lever 70, pinch roller supporting member 65 and pad supporting member 69 are automatically returned to the positions shown in the drawing respectively by the power of spring working on both supporting members 65 and 69.

Now, going back to FIG. 3 again, what is shown as 73 is a film advancing speed change over knob, and a forked part 73a is formed at a part of said knob 73. What is shown as 74 is a loop amount detection member to detect the change in the amount of film loop formed between the projection station 12 at the silent projector main body 1 and the sound recording and reproducing station 99 of the sound unit main body 49, and what is shown as 75 is a control member to adjust and control the film advancing speed of the film pull-down claw member 85 at the silent projector main body 1 according to the change in the amount of film loop detected by said loop amount detection member 74, and has a forked part 75a therefor, wherein said loop amount detection member 74 and the control member 75 are connectedly coupled together by a coupling axle 76 and a spring 77. What is shown as 78 is a speaker fixedly provided at the sound unit main body 49. Also in FIG. 5, what is shown as 80 is a fixed foot fixed at under side of the sound unit main body 49, and what is shown as 81 is a tilting foot attached also to the under side of the sound unit main body 49 in such manner that its height can be adjusted, while what is shown as 100 is a main switch operating button of the sound unit, and what is shown as 101 is a sound volume adjusting knob, while 102 is a recording button.

Next, explanations will be made on a procedure to compose a sound motion picture projection system by combining the sound recording and reproducing unit and the silent film projector having the above mentioned set up.

First, the followings are done in the silent projector shown in FIGS. 1 and 2:

(1) The base plate 3 and the first film guide path member (including the clutch roller 47 and the guide roller 46) are removed from the main body 1.

(2) The belt 38 is removed from the second tubular pulley part 32b of the pulley 32 and the belt 37 from the tubular pulley part 8b of the pulley 8.

(3) The pulley 32 is removed from the shutter axle 31 together with the belt 37.

Figure 3:
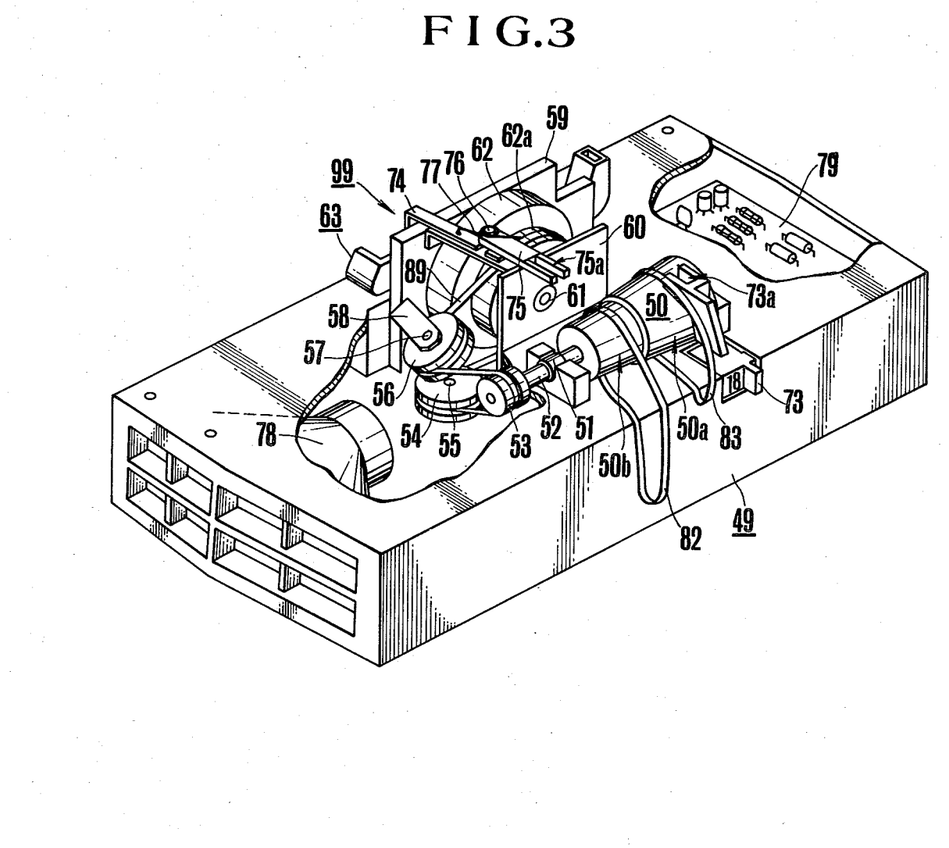
FIG. 3 is an oblique view to show an example of a sound recording and production unit which is to be combined with a projection unit when a silent film projector shown in FIG. 1, FIG. 2 are used as a projection unit to form a sound motion picture projection system, wherein a portion of a casing is broken to show its inner structure.
Figure 4:
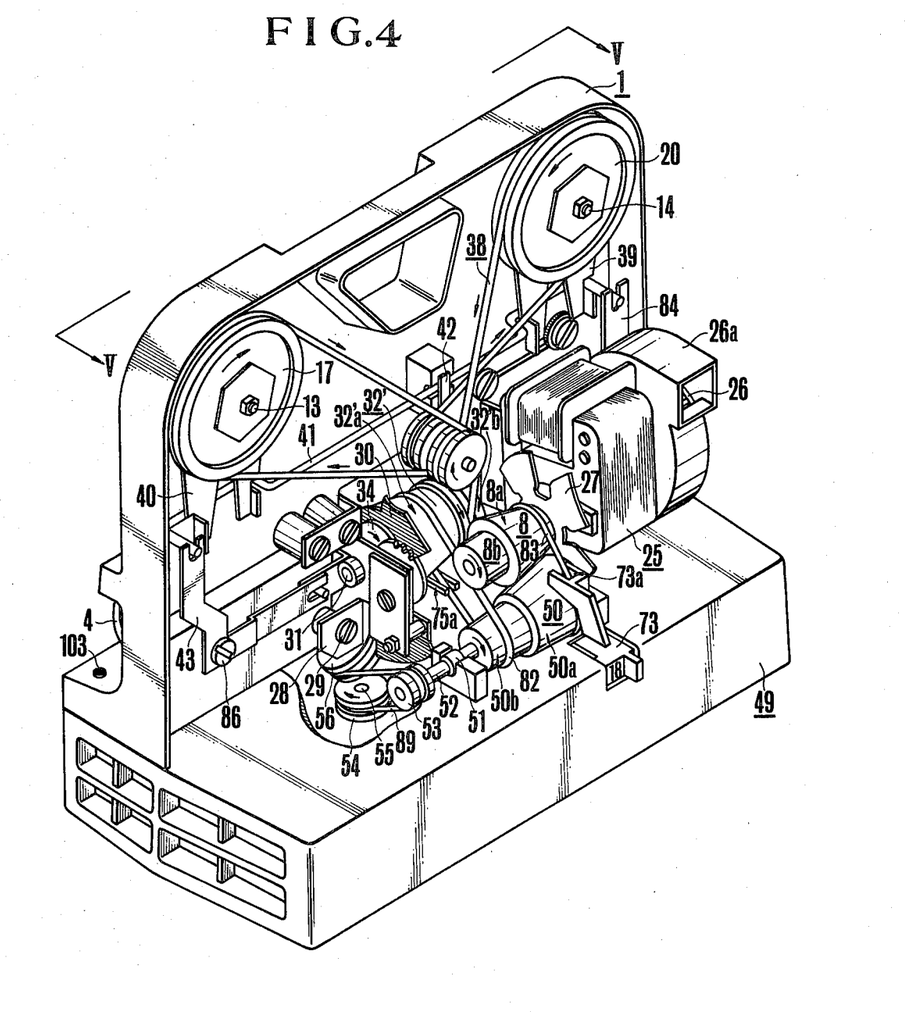
FIG. 4 is an oblique view of entire sound motion picture projection system which is made by combining a silent film projector shown in FIG. 1 and a sound unit shown in FIG. 3, showing a state that a cover is removed as in FIG. 1 to clearly show the manner of mutual coupling between both units.

Next, said projection unit is mounted on the sound unit shown in FIG. 3 and the followings are done:

(4) The pulley 32' having a cone pulley part 32'a and a tubular pulley part 32'b as shown in FIG. 4 are attached to the shutter axle 31, and at a same time the belt 82 is spanned between the cone pulley part 32'a of the pulley 32' and the second cone pulley part 50b of the pulley 50 and a portion of the belt 82 is inserted into the forked part 75a of the control member 75.

(5) The belt 83 is spanned between the cone pulley part 8a of the pulley 8 and the first cone pulley part 50a of the pulley 50 and a portion of the belt 83 is inserted into the forked part 73a of the change over member 73.

(6) The belt 38 is placed on the tubular pulley part 32'b of the pulley 32'.

(7) Lastly, the projection unit is fixed to the second unit by screws 103 (shown in FIG. 4), and the cover 2 is attached.

(Also the electrical connections between both units are made as the projection unit is mounted on the sound unit.)

Figure 6:
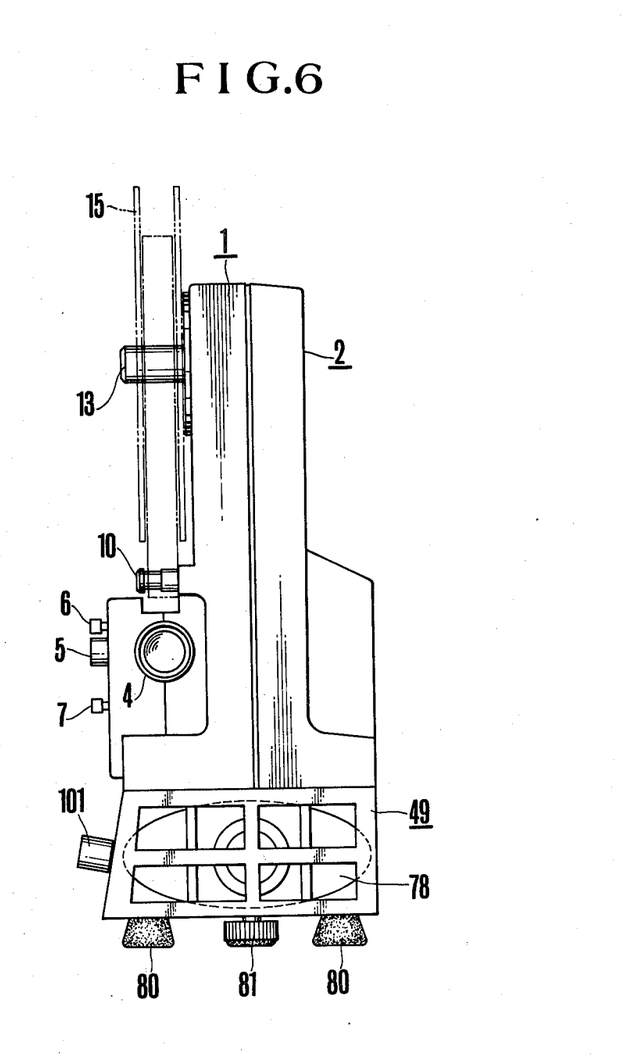
FIG. 6 is a side elevation taken along the line VI—VI.

The inner structure and outer appearance of a sound motion picture projection system thus assembled are as shown in FIGS. 4 to 6.

And in the motion picture projection system having such set up, the capstan 61 at the sound unit is driven by the motor 25 of the projection unit, and the film pull-down claw member 85 at the projection unit is driven by the power taken out of the power transmission path between said motor 25 and the capstan 61 through the speed change mechanism (cone pulley parts 50b, 32'a and belt 82), wherein the film advancing speed of said film pull-down claw member 85 is adjusted according to the change in the amount of film loop formed between the projection station 12 and the sound recording and reproducing station 99.

That is, first, as the operating handle 9 is changed over from the position of "OFF" to the position of "LOAD", the motor 25 is initiated and the capstan 61 is rotatingly driven through the pulleys 8, 50, 53, 54, 56 and the shutter axle 31 and the cam 34 through the pulleys 50 and 32', further the reel axle 14 through the pulleys 32', 35 and 20.

Therefore, by setting the operating knob 97b at the position shown as A in FIG. 5 under said state, the pinch roller 64 is separated from the capstan 61 and the pads 90 and 91 are separated from the heads 67 and 68 and the forward end of the film 48 is inserted to the projection station 12, then the film 48 is intermittently advanced at the projection station 12 by the film pull-down claw member 85 toward the film guide path member 63.

And when the forward end of the film 48 reaches the position of the capstan 61 and the pinch roller 64, the operating knob 97a is returned to the position shown in FIG. 5, then the head pads 90 and 91 are elastically connected with the heads 67 and 68 sandwiching the film 48 and at a same time the pinch roller 64 is also elastically contacted with the capstan 61 sandwiching the film 48, therefore, said film 48 is continuously advanced by the capstan 61 and the pinch roller 64 within the path member 63 and is taken out from the opening 1a through the film guide path member 88 and is finally taken up by the reel 16.

And as the operating handle 9 is further changed over to the position of "PROJECTION" under this state and at a same time the operating button 100 is changed over from the position "OFF" to the position "ON", the lamp 23 is lighted and the sound reproducing circuit within the circuit device 79 is activated, so that projection of picture image is done at the projection station 12 and reproduction of sound is done at the sound recording and reproducing station 99 simultaneously.

When the amount of the film loop formed between the projection station 12 and the sound recording and reproducing station 99 varies in a course of sound reproduction, the loop detection member 74 is shifted accordingly, and the control member 75 changes the spherical contacting position of the belt 82 on the cone pulley parts 52b, 32'a, and when the film loop is increased the film advancing speed of the claw member 85 is lowered, while the film advancing speed of the claw member 85 is increased when the film loop is decreased. Thereby the amount of film loop is maintained always in a proper range, thus synchronization of reproduced picture and sound can be satisfactorily maintained.

Also, when the projection unit is removed from the sound unit and a silent film projector is formed the above mentioned procedure may be followed in an inverse order.

As has been explained above in detail, according to the present invention, the component parts of a silent film projector and the sound film projector and assembling lines therefor can be largely made common therebetween, therefore, great cost saving can be expected, and particularly at a same time a sound projector can be composed based on a silent projector by simple handling, thus the present invention has very high practical value.

What is claimed is:

1. A sound motion picture projection system comprising:
(A) a picture projection unit having;
(A-1) a driving motor, (A-2) a first film advancing means for intermittently advancing film through a picture projection station, and (A-3) a picture projecting means disposed adjacent to said picture projection station, (B) a sound recording and reproducing unit attachable to said picture projection unit, having;

(B-1) a second film advancing means for continuously advancing the film through a sound recording and reproducing station, (B-2) a sound recording and reproducing means disposed adjacent to said sound recording and reproducing station, (B-3) a first connecting means for operatively connecting said second film advancing means with said driving motor, said first connecting means including first speed change means manually operable from outside the sound recording and reproducing unit for changing the film projection speed and the sound recording or reproduction speed, (B-4) a second connecting means for operatively connecting said first film advancing means with said driving motor through said first change means, said second connecting means being operatively coupled to said first speed change means and including second speed change means for changing the film projection speed relative to the sound recording or reproduction speed, and (B-5) a film loop sensing means for detecting the change in the amount of a film loop formed between said picture projection station and said sound recording and reproducing station, wherein said loop sensing means has an output member, which is applied to said second speed change means to change the film projection speed according to the change in the size of the film loop amount by adjusting the second speed change means.

2. A sound motion picture projection system according to claim 1, in which said second speed change means includes a pair of cone pulleys and a belt spanned between the pulleys, wherein said second connecting means includes one of the pulleys and said belt.

3. A sound motion picture projection system according to claim 2, in which said output member of the loop sensing means is applied to said belt and adjusts the spherically contacting position of said belt on said pair of pulleys to change the film projection speed.

4. A sound motion picture projection system according to claim 3, in which the first speed change means includes a pair of cone pulleys and a belt between the pulleys, and wherein the first connecting means includes one of the pulleys and the belt, said one pulley being united with the pulley in said first connecting means.

5. A sound motion picture projection system according to claim 1, in which said picture projection unit is further provided with a first film path defining means, and said sound recording and reproducing unit is further provided with a second film path defining means which can define a film path for sound recording and reproducing in place of said first film path defining means as said sound unit is attached to a picture projection unit in a state wherein said first film path defining means is removed, further said sound recording and reproducing means is provided within said sound film path defined by said second film path defining means, while said film loop sensing means is provided within said sound film path before said sound recording and reproducing means.

* * * * *